US011752498B2

(12) United States Patent
Jones et al.

(10) Patent No.: US 11,752,498 B2
(45) Date of Patent: *Sep. 12, 2023

(54) DEVICE FOR SURFACE FUNCTIONALIZATION AND DETECTION

(71) Applicant: Imec vzw, Leuven (BE)

(72) Inventors: Benjamin Jones, Kessel-Lo (BE); Tim Stakenborg, Heverlee (BE); Paolo Fiorini, Brussels (BE)

(73) Assignee: IMEC VZW, Leuven (BE)

( * ) Notice: Subject to any disclaimer, the term of this patent is extended or adjusted under 35 U.S.C. 154(b) by 0 days.

This patent is subject to a terminal disclaimer.

(21) Appl. No.: 17/475,807

(22) Filed: Sep. 15, 2021

(65) Prior Publication Data

US 2022/0008917 A1   Jan. 13, 2022

Related U.S. Application Data

(63) Continuation of application No. 15/737,013, filed as application No. PCT/EP2016/064217 on Jun. 20, 2016, now Pat. No. 11,130,124.

(30) Foreign Application Priority Data

Jun. 19, 2015  (EP) .................................... 15172909

(51) Int. Cl.
*B01L 3/00* (2006.01)
*F16K 99/00* (2006.01)
*B05C 7/04* (2006.01)

(52) U.S. Cl.
CPC ..... *B01L 3/502707* (2013.01); *B01L 3/50273* (2013.01); *B01L 3/502715* (2013.01);
(Continued)

(58) Field of Classification Search
None
See application file for complete search history.

(56) References Cited

U.S. PATENT DOCUMENTS

| 7,942,160 | B2 | 5/2011 | Jeon et al. |
| 2002/0079008 | A1 | 6/2002 | Chien et al. |
| 2002/0145231 | A1 | 10/2002 | Quake et al. |
| 2003/0143316 | A1 | 7/2003 | Eipel et al. |
| 2004/0228734 | A1 | 11/2004 | Jeon et al. |
| 2006/0054226 | A1 | 3/2006 | Yamazaki et al. |
| 2008/0190220 | A1* | 8/2008 | Backes ................ B29C 66/328 73/864.81 |

(Continued)

OTHER PUBLICATIONS

PCT International Search Report and Written Opinion, PCT International Application No. PCT/EP2016/064217, dated Sep. 9, 2016, 13 pages.

(Continued)

*Primary Examiner* — Rebecca M Giere
(74) *Attorney, Agent, or Firm* — McDonnell Boehnen Hulbert & Berghoff LLP (57) ABSTRACT

A fluidic device (100) is described for locally coating an inner surface of a fluidic channel. The fluidic device (100) comprises a first (101), a second (102) and a third (103) fluidic channel intersecting at a common junction (105). The first fluidic channel is connectable to a coating fluid reservoir and the third fluidic channel is connectable to a sample fluid reservoir. The fluidic device (100) further comprises a fluid control means (111) configured for creating a fluidic flow path for a coating fluid at the common junction (105) such that, when coating, a coating fluid propagates from the first (101) to the second (102) fluidic channel via the common junction (105) without propagating into the third (103) fluidic channel. A corresponding method for coating and for sensing also has been disclosed.

12 Claims, 6 Drawing Sheets

(52) U.S. Cl.
CPC .... *B01L 3/502738* (2013.01); *F16K 99/0021* (2013.01); *B01J 2219/00353* (2013.01); *B01J 2219/00389* (2013.01); *B01J 2219/00414* (2013.01); *B01J 2219/00418* (2013.01); *B01J 2219/00637* (2013.01); *B01L 3/502746* (2013.01); *B01L 2200/0689* (2013.01); *B01L 2300/0636* (2013.01); *B01L 2300/0816* (2013.01); *B01L 2300/0864* (2013.01); *B01L 2300/0867* (2013.01); *B01L 2300/16* (2013.01); *B01L 2400/0406* (2013.01); *B01L 2400/0487* (2013.01); *B01L 2400/0688* (2013.01); *B01L 2400/086* (2013.01); *B05C 7/04* (2013.01)

(56) References Cited

U.S. PATENT DOCUMENTS

| | | | |
|---|---|---|---|
| 2014/0332098 A1 | 11/2014 | Juncker et al. | |
| 2015/0011436 A1* | 1/2015 | Brenan | B01J 19/0046 506/32 |
| 2015/0056717 A1 | 2/2015 | Zamir et al. | |

OTHER PUBLICATIONS

Kenis, Paul J.A. et al., "Microfabrication Insid Capillaries Using Multiphase Laminar Flow Patterning", Science, vol. 285, Jul. 2, 1999, pp. 83-85.
Klent, J., "Buchner Funnels", Ohlone College Labs, Dec. 22, 2007, 1 page.

* cited by examiner

DEVICE FOR SURFACE FUNCTIONALIZATION AND DETECTION

CROSS-REFERENCE TO RELATED APPLICATIONS

The present application is a continuation of U.S. patent application Ser. No. 15/737,013, filed Dec. 15, 2017 (now U.S. Pat. No. 11,130,124), which is a section 371 U.S. national phase of International Application No. PCT/EP2016/064217 filed Jun. 20, 2016, which claims priority to European Patent Application No. 15172909.2 filed Jun. 19, 2015, the contents of all these applications which are hereby incorporated by reference.

FIELD OF THE INVENTION

The invention relates to fluidic devices. In particular it relates to methods and fluidic devices for coating inner surfaces of fluidic channels and for detecting an analyte in a fluid sample.

BACKGROUND TO THE INVENTION

Biosensors often make use of molecules such as antibodies coupled to a surface to detect an analyte in a fluid sample. To couple the antibodies to that surface, a coating fluid comprising antibodies that bind to that surface is flown over the surface. Such a surface is called a functionalized surface or a functionalized sensor region. A sample fluid containing the analyte is then directed to flow over the functionalized sensor region for performing detection.

Functionalization of the sensor region should advantageously be restricted to the sensing region. If not, by flowing the sample fluid over the functionalized area, the analyte present in the sample fluid is distributed over that region leading to depletion of the analyte. This decreases the sensitivity of the assay.

There is still a need for methods and systems for accurately providing functionalisation of a sensor region.

SUMMARY OF THE INVENTION

It is an object of the invention to increase the sensitivity of assays in fluidic devices.

It is an advantage of embodiments of the present invention that an accurate positioning of functionalization in a sensor can be obtained.

The above object and advantages are obtained by embodiments of aspects of the present invention.

In a first aspect of the invention, a fluidic device for locally coating an inner surface of a fluidic channel is presented, the fluidic device comprising: a first, a second and a third fluidic channel intersecting at a common junction, the first fluidic channel being connectable to a coating fluid reservoir and the third fluidic channel being connectable to a sample fluid reservoir; characterized in that the fluidic device further comprises a fluid control means configured for creating a fluidic flow path for a coating fluid at the common junction such that, when coating, a coating fluid propagates from the first to the second fluidic channel via the common junction without propagating or leaking into the third fluidic channel.

It is an advantage of embodiments of the present invention that functionalisation can be performed after the fluidic device has been formed, so that functionalisation does not need to be performed during the manufacturing process of the fluidic device.

According to an embodiment of the invention, the fluidic device, further comprises a fourth fluidic channel also intersecting at the common junction, and the fluid control means is configured for creating a fluidic flow path for a coating fluid at the common junction such that, when coating, a coating fluid propagates from the first to the second fluidic channel via the common junction, without propagating or leaking into the third fluidic channel and the fourth fluidic channel.

According to an embodiment of the invention, the fluid control means is a pump system.

According to an embodiment of the invention, the pump system is configured to create an inward flow in the third and the fourth fluidic channel, towards the common junction.

According to an embodiment of the invention, the fluidic control means is a capillary system.

According to an embodiment of the invention, the capillary system comprises: a capillary pump coupled to the second fluidic channel; and the resistivity of the first and the second fluidic channel and the capillary pressure in the capillary pump and in the third and fourth channels are adapted such that the coating fluid does not flow into the third or the fourth channel when propagating from the first to the second fluidic channel, via the common junction.

According to an embodiment of the invention, the third fluidic channel having an inlet for receiving the sample fluid and the second fluidic channel having an outlet for discharging fluid downstream from said inlet; the fluidic control means comprises a first fluidic structure located in the third fluidic channel between the common junction and the inlet; and the first fluidic structure is configured such that when a coating fluid propagates from the first fluidic channel into the second fluidic channel, the coating fluid only propagates to the outlet thereby at least partly coating an inner surface of the second fluidic channel and the common junction.

According to an embodiment of the invention, the fluidic control means further comprises a second fluidic structure located in the first fluidic channel and configured for sealing the first fluidic channel when a fluid sample propagates from the inlet to the outlet, thereby preventing the fluid sample from entering the first fluidic channel.

According to an embodiment of the invention, the first fluidic structure is a one-way capillary valve.

According to an embodiment of the invention, the second fluidic structure is a one-way capillary valve.

In a second aspect of the invention, a sensing system for sensing an analyte is presented, comprising: a fluidic device according to the first aspect of the invention or according to any of its embodiments; a sensor positioned for sensing an analyte in a fluid sample propagating through the fluidic device.

In a third aspect of the invention, a method for partly coating a surface of a fluidic channel is presented, comprising: providing a fluidic device having a first, a second and a third fluidic channel intersecting at a common junction; propagating a coating fluid from the first to the second fluidic channel, via the common junction, thereby coating the common junction and at least a portion of the second fluidic channel; characterized in that: while propagating the coating fluid, creating a fluidic flow path at the common junction such that the coating fluid does not propagate or leak into the third channel.

According to an embodiment of the invention, the fluidic device comprises a fourth fluidic channel also intersecting at the common junction and wherein creating a fluidic flow path comprises creating an inward flow in the third and in the fourth fluidic channel, towards the common junction.

According to an embodiment of the invention, creating a fluidic flow path comprises adapting the resistivity of the first fluidic channel, the resistivity of the second fluidic channel, and the pressure in the second fluidic channel.

In a fourth aspect of the invention, a method for sensing an analyte in a fluid sample is presented, comprising: performing all steps of the method according to the third aspect of the invention or according to any of its embodiments; thereafter sealing the first fluidic and optionally the second fluidic channel; propagating a sample fluid from the third fluidic channel through the fluidic device; and performing sensing of the analyte at least at the coated common junction.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Any reference signs in the claims shall not be construed as limiting the scope.

In the different drawings, the same reference signs refer to the same or analogous elements.

DETAILED DESCRIPTION OF ILLUSTRATIVE EMBODIMENTS OF THE PRESENT INVENTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Throughout the description reference is made to "coating fluid". This refers to a fluid comprising components that are capable of binding to a substrate surface, e.g. a silicon-based, plastic, metal or any other suitable surface. The components may have properties such as specific binding or hydrophilic/hydrophobic properties, or other properties. The components may be any binding element allowing the coupling of a target site-specific to a surface. Such elements may be antibodies or enzymes.

Throughout the description reference is made to "fluid sample". "Fluid sample" may refer to a body fluid that can be isolated from the body of an individual. Such a body fluid may refer to, but not limited to, blood, plasma, serum, bile, saliva, urine, tears, perspiration. Fluid sample may also refer to any fluid suitable for transporting objects or components in a fluidic or micro-fluidic system.

Throughout the description reference is made to "buffer fluid". "Buffer fluid" may refer to a fluid that does not react with or elute a surface coating created by the coating fluid or react with or prevent the analyte from binding with the surface coating. The buffer fluid can also be two separate, optionally different, fluids.

The technical objective problem stated above is solved by localizing binding elements, e.g. antibodies, to a specific limited area of a surface, for example a sensing surface of a sensor. By doing so, depletion of an analyte in a fluid sample flowing over that region is minimized because of the local presence of antibodies. This increases the sensitivity of the assay. However, for a microfluidic device having closed fluidic channels, it is difficult to introduce the antibodies only to a particular area of the inner surface of the fluidic channels because of their closed nature. Also, in the case of silicon to glass anodically bonded devices, application of the antibodies prior to bonding is not possible since the antibodies will not survive the required bonding temperatures. Thus, solving the technical objective problem is further complicated when dealing with closed fluidic channels of which a particular area of inner surfaces of fluidic channels must be coated.

The problem is solved by providing a cross-flow fluidic device that comprises at least three fluidic channels intersecting at a junction. Some fluidic channels are used for coating a particular area of inner surfaces of the fluidic device present at the junction. Other fluidic channels are used to flow a fluid sample over that particular area such that, for example, sensing of an analyte in the fluid sample can be performed at the junction. The device is configured such that when a coating fluid flows from one fluidic channel to another fluidic channel via the junction, the coating fluid does not propagate or leak into the other fluidic channel(s). This restriction of the fluid flow is realized by for example either a pump system, a capillary system or a passive valve system which is configured to achieve that effect.

A detailed description of embodiments of the invention is described below.

In a first aspect of the invention, a fluidic device 100 for locally coating an inner surface of a fluidic channel is presented. The fluidic device 100 comprises a first 101, a second 102 and a third 103 fluidic channel intersecting at a common junction 105. The fluidic channels may be micro-fluidic channels. The common junction 105 is defined as the inner area of the device common or shared by all fluidic channels 101, 102, 103. Thus, a fluid flowing from one fluidic channel to another fluidic channel always flows over/via the junction 105. For example, when a coating fluid flows from one fluidic channel to another fluidic channel, this coating fluid coats at least the surface area at the common junction 105. Hence, a particular area of the fluidic device can be coated with, for example, components for binding an analyte such as antibodies capable of binding an antigen.

The first fluidic channel 101 is connectable to a coating fluid reservoir and the third fluidic channel 103 is connectable to a fluid sample reservoir.

The fluidic device 100 further comprises a fluid control means 111 configured for creating, during the coating, a fluidic flow path for a coating fluid at the common junction 105. Creating the fluidic flow path ensures that a coating fluid propagating from the first 101 to the second 102 fluidic channel, via the common junction 105, does not propagate into the third 103 fluidic channel. This fluidic flow path may be created by flowing a buffer fluid towards the common junction through fluidic channels not used to flow the coating fluid. For creating this fluidic flow path, the fluidic control means may comprise a pump system. Such a pump system is adapted to create an inward flow using the buffer fluid, towards the common junction.

Optionally, the fluid control means 111 may be further configured for creating, when not coating, at least a temporary fluid flow barrier. Creating the at least a temporary fluid flow barrier ensures that a fluid sample provided in the third fluidic channel 103 and propagating in the fluidic device does not propagate into the first fluidic channel 101. For this purpose, the fluidic control means 111 may comprise one or more valves suitable for shutting the appropriate channels.

In other words, a coating fluid provided to the fluidic device 100, e.g. via the coating reservoir, can propagate through the device thereby at least partly coating an inner surface of a fluidic channel of the device 100. The inner surface being one or more inner surfaces of the device forming the common junction 105. Thereafter, a fluid sample can propagate through the device, e.g. by use of a pump, such that the fluid sample flows over the partly coated inner surface of the fluidic channel.

It is an advantage of the invention that instead of coating the complete inner surface of a fluidic channel, an inner surface of a fluidic channel can be partly coated with a coating fluid.

Figure 1:
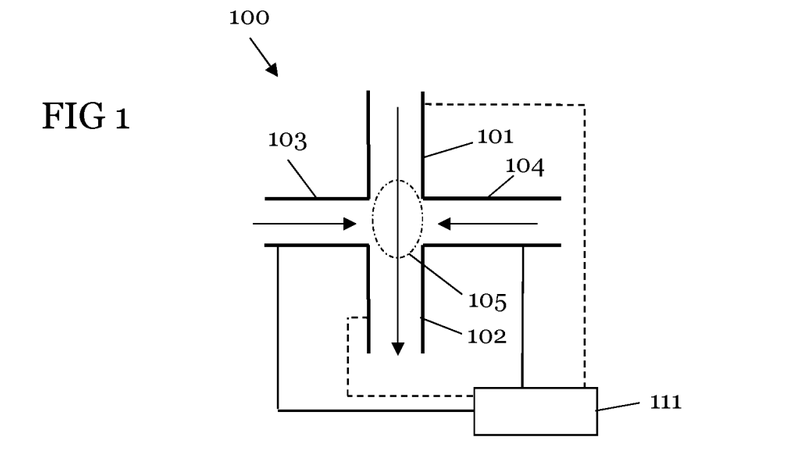
FIG. 1 illustrates a fluidic device according to an embodiment of the invention.

The fluidic device 100 presented in this invention prevents propagation of the coating fluid into channels which are not used for coating (e.g. the first fluidic channel in FIG. 1). This is an important advantage as it limits diffusion of the coating material (e.g. antibodies) contained within the coating fluid into those channels. Generally the fluid composing the coating fluid and buffer fluid is the same. What is dissolved into the coating fluid (the coating material) should not diffuse too far away from, for example, a detection zone (e.g. a biosensor).

It is a further advantage of the invention that the structure of the fluidic device 100 allows all fluidic channels to be closed fluidic channels. This in contrast to prior art devices in which fluidic channels must be open to allow the coating, e.g. by external spotting, of particular areas of inner surface of the fluidic channels.

According to an embodiment of the first aspect of the invention, the fluidic device further comprises a fourth 104 fluidic channel also intersecting at the common junction 105. In such an embodiment the fluid control means 111 is configured for creating a fluidic flow path for a coating fluid at the common junction 105 such that, when coating, a coating fluid propagates from the first 101 to the second 102 fluidic channel via the common junction 105, without propagating into the third 103 fluidic channel and the fourth 104 fluidic channel. Optionally, the fluid control means 111 is further configured for creating at least a temporary fluid flow barrier such that, when not coating, a fluid sample propagating from the third 103 to the fourth 104 fluidic channel does not propagate into first 101 and/or the second 102 fluidic channel. FIG. 1 illustrates such an embodiment. FIG. 1 illustrates a fluidic device 100 according to an embodiment of the invention. The device 100 comprises a first 101, a second 102, a third 103 and a fourth 104 fluidic channel. All four fluidic channels intersect at the common junction 105. A fluidic control means 111 is coupled to the third 103 and the fourth 104 fluidic channel. When a coating fluid propagates from the first 101 to the second fluidic channel 102, the fluid flows over the common junction 105 thereby coating that junction 105. During the coating, the fluidic control means 111 is active and the coating fluid will only propagate from the first 101 to the second 102 fluidic channel and not propagate into the third 103 and the fourth 104 fluidic channel. After the coating, a fluid sample may then propagate from the third 103 to the fourth 104 fluidic channel, over the common junction 105.

The fluid control means 111 may comprise a means for sealing the fluidic channels used for coating. The means for sealing fluidic channels may be one or more valves. For example, after the coating, the fluid control means 111 can seal one or more fluidic channels which are used for performing the coating, in close proximity of the common junction 105. As an advantage, by sealing those fluidic channels, a fluid sample propagating through the fluidic device does not propagate into these coating fluidic channels.

According to the embodiment illustrated in FIG. 1, the fluidic control means 111 comprises a means for sealing the first 101 and the second 102 fluidic channel. By sealing these channels, the fluid sample does not propagate into first 101 and the second 102 fluidic channels. As an advantage, depletion of the analyte in the fluid sample does not occur and sensitivity of the assay in the fluidic device is increased.

According to a particular embodiment of the first aspect of the invention an array of fluidic devices 100, 100', 100", corresponding with fluidic devices as illustrated in FIG. 1, are fluidically interconnected.

The array may be a 1D array. Such a 1D array comprises a row of fluidic device 100 of which the fluidic channels 101, 102, 101', 102', 101", 102", which are used to coat the common junctions 105, 105', 105" of each fluidic device 100, are fluidically connected such that a single sample of coating fluid can propagate through the fluidic channels 101, 102, 101', 102', 101", 102" and coat all common junctions 105, 105', 105". It is an advantage of the invention that the same coating fluid can be used to coat different common junctions 105, 105', 105". It is an advantage of the invention that it is not necessary to individually perform the coating of different common junctions 105, 105', 105". This simplifies and reduces time to perform the coating.

Figure 2:
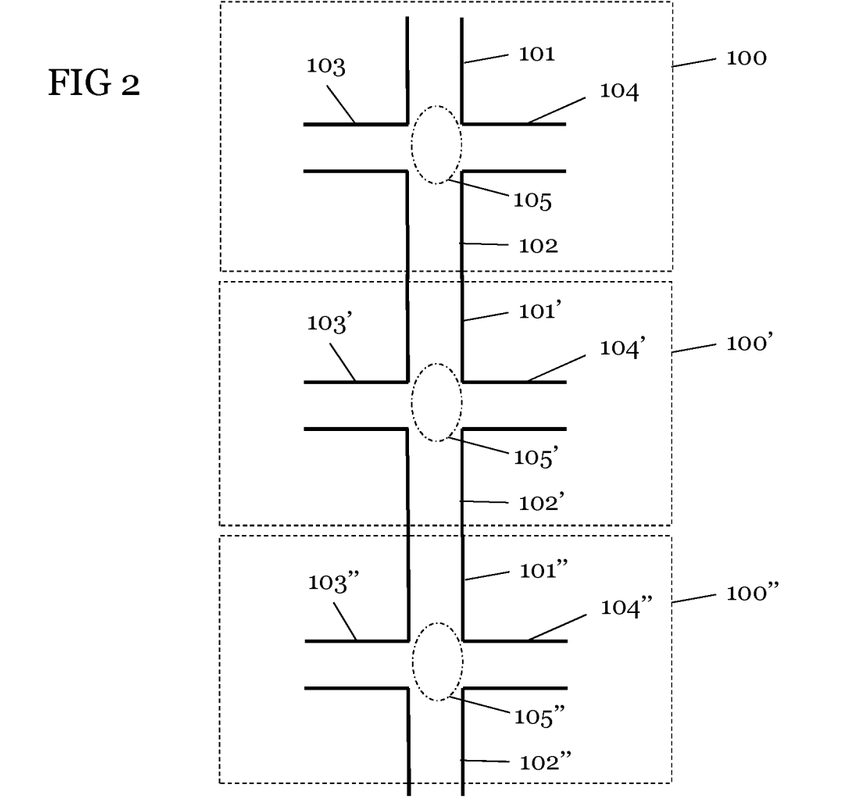
FIG. 2 illustrates a system comprising a row of interconnected fluidic devices according to embodiments of the invention.

The system of FIG. 2 illustrates such a 1D array. It comprises three fluidic devices 100, 100', 100". Fluidic channel 102 is fluidically connected to fluidic channel 101'. Fluidic channel 102' is fluidically connected to fluidic channel 101". A coating fluid provided in fluidic channel 101 can propagate all the way down to fluidic channel 102", via common junctions 105, 105', 105". During the propagation, the common junctions 105, 105', 105" are coated by the same coating fluid.

The array may also be a 2D array. In such a 2D array, in each row the fluidic channels used to coat the common junctions are fluidically interconnected such that the common junctions of the fluidic devices in each row can be coated with the same coating fluid. Also, common junctions of different rows can be coated with different coating fluids. Further, in such a 2D array, in each column, the fluidic channels used to propagate a fluid sample are fluidically interconnected such that a fluid sample may flow from one row to another row via common junctions. It is an advantage that common junctions in different rows can be coated with different coating fluids. This allows detection of different analytes in the same fluid sample. It is a further advantage that different fluid samples can be provided to the device. These different fluid samples can individually flow over different common junctions coated with the same or a different coating fluid. This allows the detection of different analytes in different fluid sample provided to the array.

Figure 3:
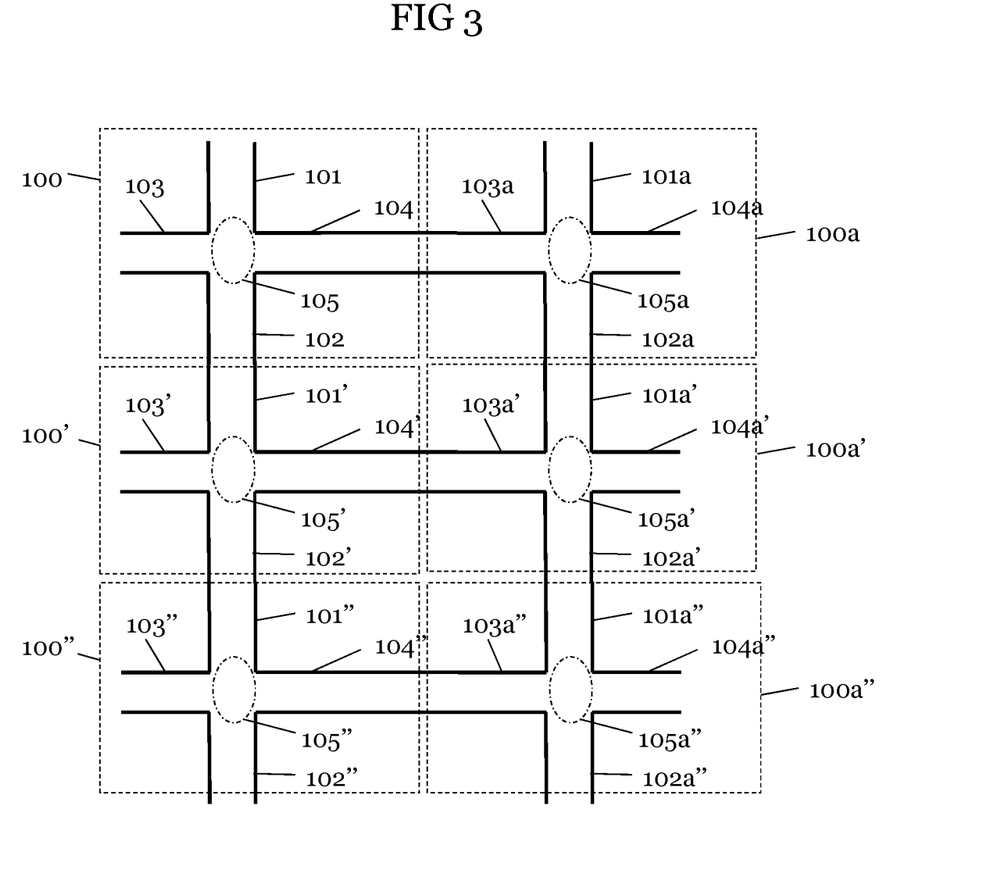
FIG. 3 illustrates a system comprising a matrix of interconnected fluidic devices according to embodiments of the invention.

The system of FIG. 3 illustrates such a 2D array. It comprises six fluidic devices 100, 100', 100", 100a, 100a', 100a". Fluidic channel 102 is fluidically connected to fluidic channel 101'. Fluidic channel 102' is fluidically connected to fluidic channel 101". A coating fluid provided in fluidic channel 101 can propagate all the way down to fluidic channel 102", via common junctions 105, 105', 105". During the propagation, the common junctions 105, 105', 105" are coated by the same coating fluid. Fluidic channel 102a is fluidically connected to fluidic channel 101a'. Fluidic channel 102a' is fluidically connected to fluidic channel 101a". A coating fluid provided in fluidic channel 101a can propagate all the way down to fluidic channel 102a", via common junctions 105a, 105a', 105a". During the propagation, the common junctions 105a, 105a', 105a" are coated by the same coating fluid. Fluidic channel 104 is fluidically connected to fluidic channel 103a. Fluidic channel 104' is fluidically connected to fluidic channel 103a'. Fluidic channel 104" is fluidically connected to fluidic channel 103a". A fluid sample may be introduced into fluidic channel 103 and propagate all the way to fluidic channel 104a, via common junctions 105, 105a. Another fluid sample may be introduced into fluidic channel 103' and propagate all the way to fluidic channel 104a', via common junctions 105', 105a'. Yet another fluid sample may be introduced into fluidic channel 103" and propagate all the way to fluidic channel 104a", via common junctions 105", 105a". Thus, in the device illustrated in FIG. 3, two different coating fluids may be introduced in the device to perform coating of the common junctions and three different fluid samples may be introduced wherein each fluid sample can flow over a differently coated common junction.

According to an embodiment of the first aspect of the invention, the fluid control means 111 comprises a pump system. The pump system is configured to create an inward flow rate in fluidic channels, towards the common junction. For that purpose a buffer fluid may be used. The flow rate may be inwards from different sides while allowing for a fluidic flow path for a fluid flowing through the common junction, via fluidic channels 101 and 102. As illustrated in FIG. 1, the pump system creates a flow rate in the third 103 and the fourth 104 fluidic channel towards the common junction 105. The amount of flow rate applied is selected such that propagation of a coating fluid from the first 101 to the second 102 fluidic channel is possible and propagation of the coating fluid in the third 103 or the fourth 104 fluidic channel minimized. The amount of the flow rate can be determined experimentally by using, for example, dye coloured fluids which allow observing when the diffusion flow rate is balanced by the flow rate created by the fluid control means 111.

Figure 4:
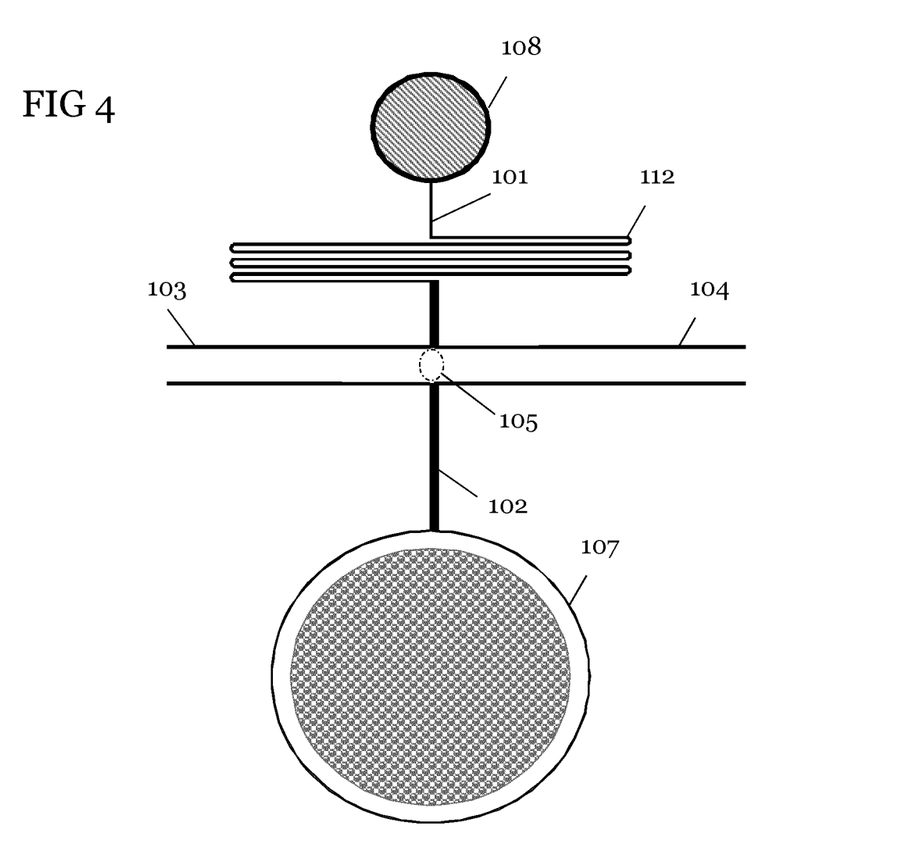
FIG. 4 illustrates a capillary fluidic device according to an embodiment of the invention.

According to an embodiment of first aspect of the invention, the fluidic control means 111 is a capillary system. In such an embodiment, the coating is performed solely using capillary forces. Such an embodiment is illustrated in FIG. 4. The device comprises a first 101, a second 102, a third 10S and a fourth 104 fluidic channel. These fluidic channels intersect at a common junction 105. The first fluidic channel 101 is connected to an inlet 108 for providing a coating fluid in the first fluidic channel 101. The first 101 and the second 102 fluidic channels are fluidic channels having capillary dimensions. Thus, the dimensions of these channels, typically ranging from sub-micron to millimetre scale, are selected such that they are suitable for use in a capillary system. The second fluidic channel 102 is fluidically connected to a capillary pump 107 adapted to suck a coating fluid present in the first fluidic channel 101 into the second 102 fluidic channel. The resistivity of the first 101 and the second 102 fluidic channel and the capillary pressure in the capillary pump 107 and in the third 103 and fourth 104 channels are adapted, e.g. by selecting appropriate channel diameters, such that the coating fluid does not propagate into the third 103 or the fourth 104 channel when propagating from the first 101 to the second 102 fluidic channel, via the common junction 105. It is an advantage of the invention that such an embodiment does not require active components such as valves or active pumps. This reduces power consumption and cost of the complete device.

According to embodiments of the first aspect of the invention, the first fluidic channel has a high resistivity, the second fluidic channel has a low resistivity. Assuming a fluid viscosity of $10^{-3}$ Pa·s, the resistivity of the first fluidic channel 101 may be between $10^8$ and $10^{26}$ Pa·s/m³/m of channel length. The resistivity of the second fluidic channel 102 may also be between $10^8$ and $10^{26}$ Pa·s/m³/m of channel length. The relative resistances of channel 101 and 102 must be such that equation (4) is satisfied. The capillary pressure of the pump may be between 100 Pa and 1 MPa. It is important that the capillary pressure in channel 103 and 104 is lower than the capillary pressure in the pump. For example, in a particular embodiment of the invention assuming a fluid viscosity of $10^{-3}$ Pa·s, the resistivity of the first fluidic channel 101 is $10^{19}$ Pa·s/m³. The resistivity of the second fluidic channel 102 is $5 \times 10^{17}$ Pa·s/m³. The capillary pressure of the pump is about 5 kPa. The capillary pressure in channels 103 and 104 is about 2 kPa.

According to embodiments of the first aspect of the invention, at least a part of the first fluidic channel 101 is shaped such that the resistivity of the first fluidic channel 101 is increased. For example, to increase the resistivity of the first fluidic channel 101, the first fluidic channel 101 may comprise a fluidic structure 112 adapted to increase the resistivity of the first fluidic channel 101. The fluidic structure 112 may be meander-shaped. The dimensions of the second fluidic channel 102 are selected such that the resistivity of the second fluidic channel 102 is lower than the resistivity of the first fluidic channel 101. At least a part of the second fluidic channel 102 may be shaped such that the resistivity of the second fluidic channel 102 is lower than the resistivity of the first fluidic channel 101.

Figure 5:
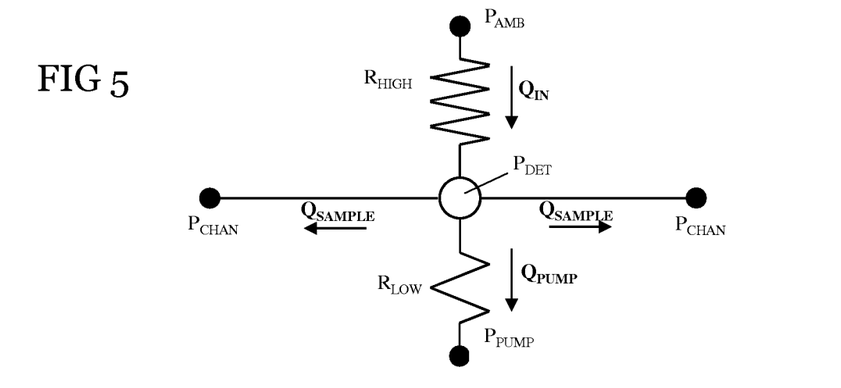
FIG. 5 illustrates an equivalent fluidic resistor network for the embodiment illustrated in FIG. 4.

When a droplet of the coating fluid is provided in the reservoir 108, through capillary forces the droplet is pulled through first fluidic channel 101 (high resistance) into the common junction 105, into the second fluidic channel 102 (low resistance), and into the coating capillary pump 107. Propagation of the coating fluid into the third 103 and fourth 104 fluidic channel is avoided by careful control of the capillary forces thereby allowing the coating fluid to be sucked directly into the second fluidic channel 102 and into the capillary pump 107 without entering the third 103 and the fourth 104 fluidic channel. FIG. 5 shows an equivalent fluidic resistor network for the embodiment illustrated in FIG. 4. During the coating process, the capillary pump 107 flow rate is:

$$Q_{PUMP} = Q_{IN} - 2Q_{SAMPLE} \quad (1)$$

It is desirable that no fluid enters the third 103 and the fourth 104 fluidic channels, i.e. $Q_{SAMPLE} \leq 0$. So equation (1) then yields:

$$Q_{PUMP} \geq Q_{IN} \quad (2)$$

The pressure drop, ▯p, hydraulic resistance, R, and flow rate, Q, are related by:

$$\Delta p = RQ \quad (3)$$

So equation (2) can be written as:

$$\frac{P_{CHAN} - P_{PUMP}}{R_{LOW}} \geq \frac{P_{AMB} - P_{CHAN}}{R_{HIGH}} \quad (4)$$

where $P_{CHAN}$ is the capillary pressure in the third 103 and fourth 104 fluidic channel, $P_{PUMP}$ is the capillary pressure in the capillary pump 107 and the second fluidic channel 102, and $P_{AMB}=0$ is the ambient pressure. Note here that by convention, $P_{CHAN}$ and $P_{PUMP}$ are negative (below the ambient pressure). Equation (4) thus gives a condition that must be satisfied to ensure that the coating fluid does not propagate into the third 103 and the fourth 104 fluidic channels during capillary pumping. A further condition arises while the capillary system is filling with the coating liquid prior to entering the low resistance channel. The common junction 105 must easily wet and bring the fluid to the second fluidic channel 102 without entering the third 103 and the fourth 104 fluidic channels. This is satisfied if $P_{DET} < P_{CHAN}$, i.e. the capillary pressure in the common junction 105 must be stronger than the capillary pressure in the third and the fourth fluidic channels, and $P_{PUMP} < P_{CHAN}$. The capillary pressure in a rectangular channel is given by:

$$\Delta P = -\sigma \left( \frac{2}{W_C} + \frac{2}{H_C} \right) \cos(\theta) \quad (5)$$

where σ is the surface tension, $W_c$ is the channel width, $H_c$ is the channel height, and θ is the contact angle between the liquid-vapor interface and the solid surfaces of the channel wall. If the channel at the common junction 105 and the third 103 and fourth 104 fluidic channels are of the same widths, the channel at the common junction 105 must have a more shallow depth to satisfy the criteria $P_{DET} < P_{CHAN}$. Alternatively, if the channel at the common junction 105 and the third 103 and fourth 104 fluidic channels are the same height, micropillars or other capillary wicking structures can be added inside the detector to locally decrease the capillary pressure in this region. $P_{PUMP} < P_{CHAN}$ can easily be satisfied by making the capillary pump 107 and the second fluidic channel 102 with a smaller channel width than the third 103 and the fourth 104 fluidic channels.

Figure 11:
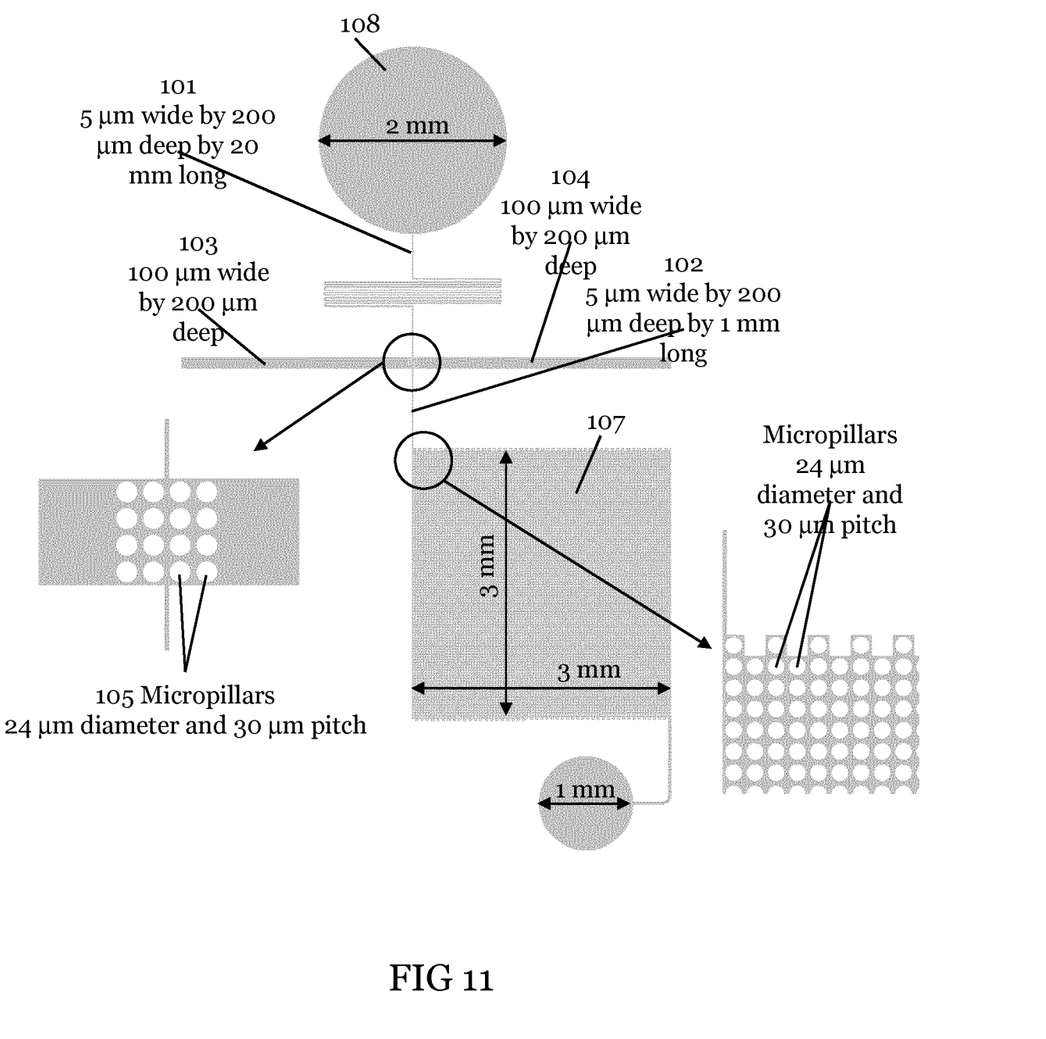
FIG. 11 illustrates a capillary flow device according to an embodiment of the invention The drawings are only schematic and are non-limiting. In the drawings, the size of some of the elements may be exaggerated and not drawn on scale for illustrative purposes.

A particular embodiment of the first aspect of the invention, including all dimensions, is illustrated in FIG. 11. In this embodiment, the diameter of the reservoir is 2 mm. The first fluidic channel 101 is 5 μm wide by 200 μm deep by 20 mm long. The second fluidic channel 102 is 5 μm wide by 200 μm deep by 1 mm long. The common junction 105 comprises micropillars with 24 μm diameter and 30 μm pitch. The third fluidic channel 103 is 100 μm wide by 200 μm deep. The fourth fluidic channel 104 is 100 μm wide by 200 μm deep. The capillary pump 107 comprises an array with micropillars having 24 μm diameter and 30 μm pitch. The dimension of the array is 3 mm by 3 mm. Downstream of the micropillars of the capillary pump, an outlet vent with a diameter of 1 mm is present.

Figure 6:
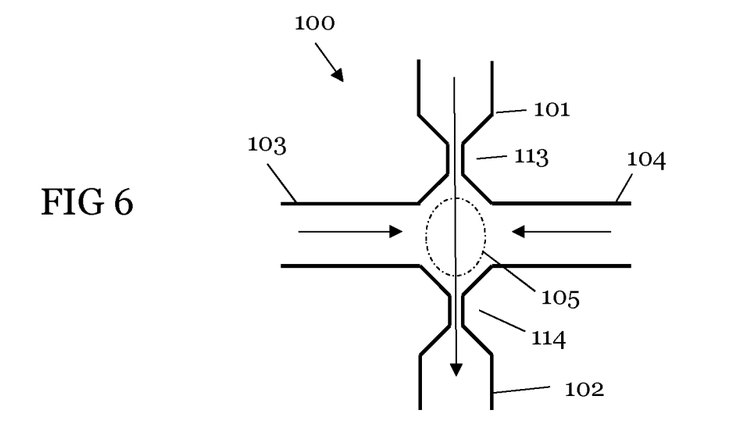
FIG. 6 illustrates a fluidic device according to an embodiment of the invention

According to an embodiment of the first aspect of the invention, the first and/or the second fluidic channels comprises a restriction 113, 114. Such a restriction is a portion of the fluidic channel that is narrower compared to the rest of the fluidic channel. As an advantage, by correctly dimensioning and positioning these restrictions, relative to the common junction 105, fluid flow and propagation of the coating fluid into the third 103 and fourth 104 fluidic channels is minimized. FIG. 6 illustrates such an embodiment. FIG. 6 illustrates the same embodiment as FIG. 1 but the first 101 and the second 102 fluidic channel now each feature a restriction 113, 114.

Figure 7:
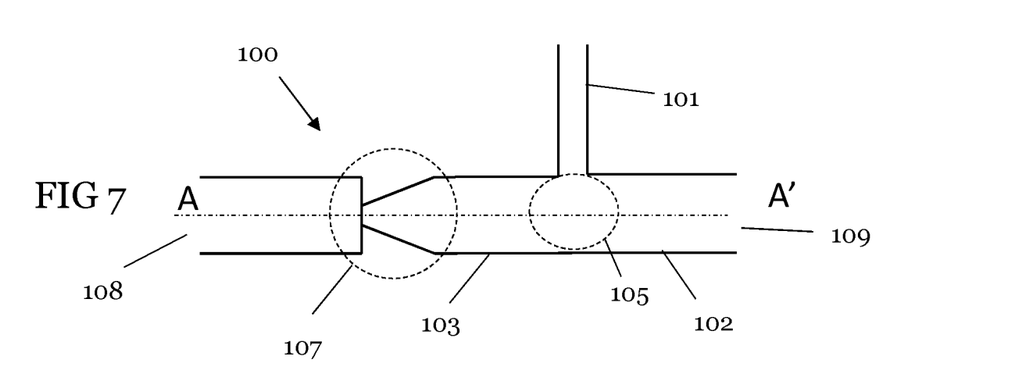
FIG. 7 illustrates a fluidic device according to an embodiment of the invention

According to an embodiment of first aspect of the invention, the third fluidic channel 103 comprises an inlet 108 for receiving the fluid sample and the second fluidic channel 102 comprises an outlet 109 for discharging the fluid sample downstream from said inlet 108. The fluid control means 111 comprises a first fluidic structure 107 located in the third fluidic channel 103, in between the common junction 105 and the inlet 108. The first fluidic structure 107 is configured such that when a coating fluid propagates from the first fluidic channel 101 into the second fluidic channel 102, the coating fluid only propagates to the outlet 109 thereby coating the common junction 105 and at least partly coating an inner surface of the second fluidic channel 102. In other words, the fluidic structure 107 is configured to block a fluid from propagating from the common junction 105 towards the inlet 108. Thus, the fluidic structure 107 functions as a one-way check valve preventing any fluid propagating towards the inlet 108, from the common junction 105. As a result, only the common junction 105 and second fluidic channel 102 are coated by a coating fluid provided in the first fluidic channel 101. FIG. 7 illustrates such an embodiment.

FIG. 7 illustrates a fluidic device comprising three fluidic channels 101, 102, 103. The three fluidic channels 101, 102, 103 intersect at a common junction 105. The third fluidic channel 103 has an inlet 108 for providing a fluid sample in the third fluidic channel 103. The second fluidic channel has an outlet 109 for exiting a fluid sample. A fluidic structure 107 is located in the third fluidic channel, in between the inlet 108 and the common junction 105. The fluidic structure 107 is configured to block a fluid from propagating from the common junction 105 to the inlet 108 but allows a fluid to propagate from the inlet 108 to the common junction 105. Hence, the fluidic structure 107 is a unidirectional fluidic structure.

Figure 8:
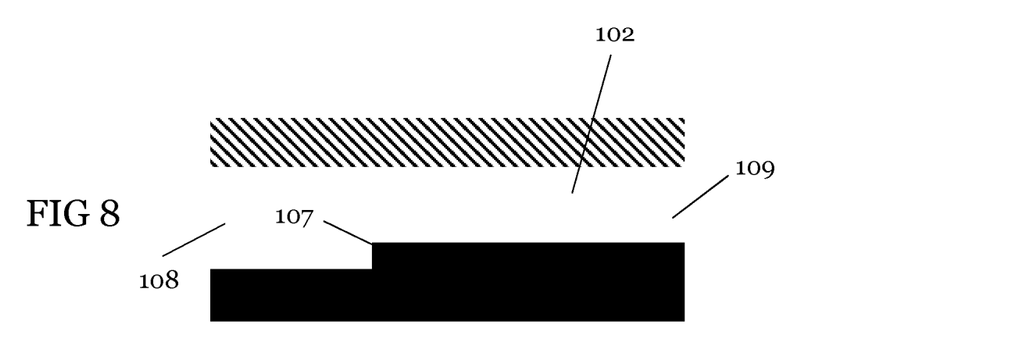
FIG. 8 illustrates a cross section of the fluidic device illustrated in FIG. 7

According to an embodiment of the first aspect of the invention, the fluidic structure 107 is a one-way capillary valve. An implementation of a one-way capillary valve may be an abrupt change in the geometry of an inner surface of the third fluidic channel 103. The upper wall facing the inner surface comprising the abrupt change in geometry may be hydrophobic. Alternatively, at least the fluidic channel comprising the one-way capillary valve is open such that there is no top wall or cover. For example, the abrupt change may be a sudden height difference in the inner surface of the third fluidic channel 103. Such a sudden height difference is illustrated in the cross sectional view in FIG. 8 that illustrates cross-section A-A' of FIG. 7.

Figure 9:
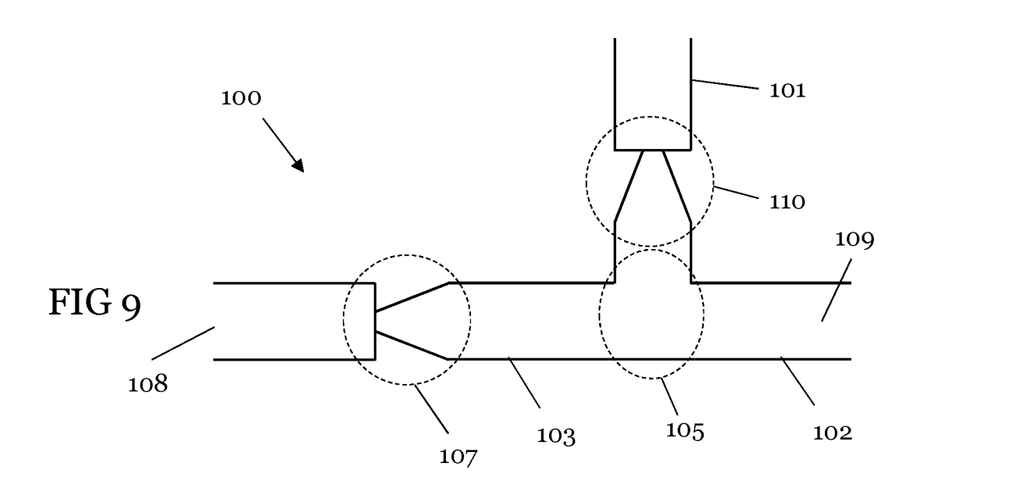
FIG. 9 illustrates a fluidic device according to an embodiment of the invention

According to an embodiment of the first aspect of the invention, the fluid control means 111 may further comprise a means for sealing the first fluidic channel 101 when a fluid sample propagates from the inlet 108 to the outlet 109 to prevent the fluid sample from entering the first fluidic channel 101 which would lead to depletion of an analyte in the fluid sample. Such a means may e.g. be a valve. According to a particular embodiment of the invention, the first fluidic channel 101 comprises a one-way capillary valve. This one-way capillary valve is positioned such that a fluid, e.g. a coating fluid, provided in the first fluidic channel 101 is allowed to propagate to the common junction 105. A fluid sample propagating from the inlet 108 to the outlet 109, is blocked from propagating from the common junction 105 into the first fluidic channel 101 by this one-way capillary valve. Such an embodiment is illustrated in FIG. 9.

According to a second aspect of the invention, a sensing system is presented. The sensing system can be used to detect an analyte in a fluid sample. The sensing system comprises a fluidic device 100 as presented in the first aspect of the invention or according to any of its embodiments. The sensing system further comprises a sensor 106 positioned at/near the inner surfaces of the fluidic device 100 which can be coated. The sensor is capable of sensing an analyte in a fluid sample. The sensor 106 may be a biosensor, e.g. an affinity based sensor. The sensor 106 may also be an image sensor. Preferably, the sensor 106 is positioned at the common junction 105. The sensor 106 may be integrated in an inner surface of fluidic channels of the fluidic device 100. For example, at the common junction 105, the sensor 106 may be integrated in an inner surface of the fluidic device 100 such that, in a first step, a top surface of the sensor 106 can be coated with a coating fluid. In a second step, a fluid sample may be flown over that coated top surface and detection of an analyte bound to or present at the coated top surface may be performed by the sensor 106. Alternatively, the sensor 106 may be positioned such that light, e.g. fluorescent signals, from a coated inner surface can be received by the sensor 106. For that purpose, an image sensor may be positioned such that its sensing side is exposed to light signals originating from a coated surface of the device. The sensor 106 may be positioned adjacent to coated surfaces, for example at the common junction, such that light signals can be received.

It is an advantage of the invention that it can be accurately determined which areas of inner surfaces of the fluidic device are coated with a coating fluid. Hence, it can be accurately determined where one or more sensors should be positioned in the fluidic device. As an advantage, more accurate sensing can be performed. In a device with closed fluidic channels, this is very advantageous.

Figure 10:
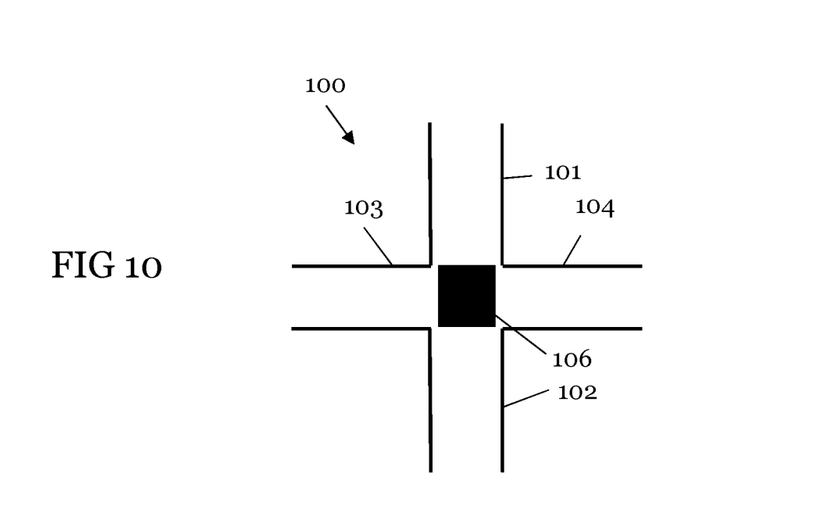
FIG. 10 illustrates a sensing system according to an embodiment of the invention

FIG. 10 illustrates an embodiment of the invention comprising a sensor 106. FIG. 10 features a similar embodiment as illustrated in FIG. 1. In addition to FIG. 1, the system further comprises a sensor 106 positioned at the common junction 105. In the embodiments illustrated in FIG. 7 and FIG. 9 also the inner surfaces of the second fluidic channel 102 are coated with a coating fluid propagating from the first 101 to the second 102 fluidic channel. Thus, the sensor 106 may be positioned at the common junction 105 and at the inner surfaces of fluidic channel 102.

According to a third aspect of the invention, a method for partly or locally coating a surface of a fluidic channel is presented. The method comprises, in a first step, providing a fluidic device 100 having a first 101, a second 102 and a third 103 fluidic channel intersecting at a common junction 105. In a second step, a coating fluid is propagated from the first 101 to the second 102 fluidic channel, via the common junction 105. By doing so, at least the common junction 105 is coated by the coating fluid. In other words, the areas of the inner surfaces of the fluidic channels forming this common junction 105 are coated. While propagating the coating fluid, a fluidic flow path is created at the common junction 105 such that the coating fluid does not propagate into the third 103 channel.

According to an embodiment of the third aspect of the invention, the fluidic device 100 further comprises a fourth fluidic channel 104, also intersecting at the common junction 105. Creating the fluidic flow path comprises creating an inward flow in the third 103 and the fourth 104 fluidic channel, towards the common junction 105. Creating the inward flow may be achieved by flowing a buffer fluid towards the common junction 105. For example, flowing the buffer fluid in the third 103 and the fourth 104 fluidic channel, towards the common junction 105.

S According to another embodiment of third aspect of the invention, the fluidic device 100 further comprises a fourth fluidic channel 104, also intersecting at the common junction 105, and creating a fluidic flow path comprises adapting the resistivity of the first 101, the resistivity of the second 102 fluidic channel, and the pressure in the second 102 fluidic channel.

According to an embodiment of the third aspect of the invention, the method may also comprise a step of sealing the fluidic channels used to propagate the coating fluid.

According to a fourth aspect of the invention, a method for sensing an analyte in a fluid sample is presented. The method comprising performing, in a first step, all steps of the method as described in the third aspect of the invention or according to any of its embodiments. In a second step, a fluid sample is propagated from the third fluidic channel 103 through the fluidic system. While the fluid sample is propagated through the fluidic device, it flows over the common junction 105 and sensing of the analyte in the fluid sample at the coated common junction 105 is performed.

The method as described in the fourth aspect of the invention may be implemented using the sensing system as described in the second aspect of the invention, or according to any of its embodiments.

In one aspect, the present invention also relates to the use of a fluidic structure as described in the first aspect for coating a particular area, e.g. a sensing region.

The invention claimed is:

1. A fluidic device for locally coating an inner surface of a fluidic channel and modifying an inner surface of a fluidic channel with a coating fluid, the fluidic device comprising:
a first fluidic channel, a second fluidic channel, and a third fluidic channel intersecting at a common junction, wherein the first fluidic channel is connectable to a coating fluid reservoir, wherein the third fluidic channel is connectable to a sample fluid reservoir, and wherein the coating fluid comprises elements that bind to a target analyte in a fluid sample; and
a fluid control means configured for creating a fluidic flow path for the coating fluid at the common junction such that, when coating, the coating fluid propagates from the first fluidic channel to the second fluidic channel via the common junction without propagating into the third fluidic channel;
wherein the fluid control means comprises a capillary system,
wherein the capillary system comprises a capillary pump coupled to the second fluidic channel and configured to suction the coating fluid from the first fluidic channel to the second fluidic channel,
wherein a resistivity of the first fluidic channel, a resistivity of the second fluidic channel, a capillary pressure in the capillary pump, and a capillary pressure in the third fluidic channel is such that the coating fluid does not flow into the third fluidic channel when propagating from the first fluidic channel to the second fluidic channel, via the common junction, and
wherein at least part of the first fluidic channel is meander-shaped such that the resistivity of the first fluidic channel is greater than the resistivity of the second fluidic channel.

2. The fluidic device according to claim 1, further comprising a fourth fluidic channel also intersecting at the common junction, wherein the fluid control means is configured for creating the fluidic flow path for the coating fluid at the common junction such that, when coating, the coating fluid propagates from the first to the second fluidic channel via the common junction, without propagating into the third fluidic channel and the fourth fluidic channel; and
wherein the capillary system is further configured to provide a capillary pressure in the fourth fluidic channel such that the coating fluid does not flow into the third fluidic channel or the fourth fluidic channel when propagating from the first fluidic channel to the second fluidic channel, via the common junction.

3. The fluidic device according to claim 2, wherein at least part of the first fluidic channel, at least part of the second fluidic channel, or both include a restriction that is dimensioned and positioned relative to the common junction such that fluid flow and propagation of the coating fluid into the third and fourth fluidic channels is minimized.

4. The fluidic device according to claim 1, wherein the common junction and the capillary pump further comprise capillary wicking structures.

5. The fluidic device according to claim 1, wherein the capillary system is configured such that $$\frac{P_{CHAN} - P_{PUMP}}{R_{LOW}} \geq \frac{P_{AMB} - P_{CHAN}}{R_{HIGH}},$$

where
$P_{CHAN}$ is the capillary pressure in the third fluidic channel,
$P_{PUMP}$ is the capillary pressure in the capillary pump,
$P_{AMB}$ is ambient pressure,
$R_{HIGH}$ is the resistivity of the first fluidic channel, and
$R_{LOW}$ is the resistivity of the second fluidic channel.

6. The fluidic device according to claim 2, wherein the capillary system is configured such that $$\frac{P_{CHAN} - P_{PUMP}}{R_{LOW}} \geq \frac{P_{AMB} - P_{CHAN}}{R_{HIGH}},$$

where
$P_{CHAN}$ is the capillary pressure in the third and fourth fluidic channels,
$P_{PUMP}$ is the capillary pressure in the capillary pump,
$P_{AMB}$ is ambient pressure,
$R_{HIGH}$ is the resistivity of the first fluidic channel, and
$R_{LOW}$ is the resistivity of the second fluidic channel.

7. A fluidic device for locally coating and modifying an inner surface of a fluidic channel with a coating fluid, the fluidic device comprising:
- a coating fluid reservoir, wherein the coating fluid comprises elements that bind to a target analyte in a fluid sample;
- an outlet vent;
- a first fluidic channel, a second fluidic channel, and a third fluidic channel intersecting at a common junction, wherein the first fluidic channel is connected to the coating fluid reservoir, and wherein the third fluidic channel is connectable to a sample fluid reservoir; and
- a fluid control means configured for creating a fluidic flow path for the coating fluid at the common junction such that, when coating, the coating fluid propagates from the first fluidic channel to the second fluidic channel via the common junction without propagating into the third fluidic channel;
  - wherein the fluid control means comprises a capillary system,
  - wherein the capillary system comprises a capillary pump coupled to the second fluidic channel and the outlet vent,
  - wherein a resistivity of the first fluidic channel, a resistivity of the second fluidic channel, a capillary pressure in the capillary pump, and a capillary pressure in the third fluidic channel such that the coating fluid does not flow into the third fluidic channel when propagating from the first fluidic channel to the second fluidic channel, via the common junction, and
  - wherein at least part of the first fluidic channel is meander-shaped such that the resistivity of the first fluidic channel is greater than the resistivity of the second fluidic channel.

8. A sensing system for sensing an analyte, comprising:
a fluidic device according to claim 1; and
a sensor positioned for sensing an analyte in a fluid sample propagating through the fluidic device.

9. A sensing system for sensing an analyte, comprising:
a fluidic device according to claim 7; and
a sensor positioned for sensing an analyte in a fluid sample propagating through the fluidic device.

10. A method for partly coating and modifying an inner surface of a fluidic channel with a coating fluid, comprising:
providing a fluidic device having:
- a first fluidic channel, a second fluidic channel, and a third fluidic channel intersecting at a common junction, wherein the first fluidic channel is connected to a coating fluid reservoir, wherein the third fluidic channel is connected to a sample fluid reservoir, and wherein the coating fluid comprises elements that bind to a target analyte in a sample fluid;
- a fluid control means configured for creating a fluidic flow path for the coating fluid at the common junction such that, when coating, the coating fluid propagates from the first fluidic channel to the second fluidic channel via the common junction without propagating into the third fluidic channel;
  - wherein the fluid control means comprises a capillary system,
  - wherein the capillary system comprises a capillary pump coupled to the second fluidic channel, and
  - wherein a resistivity of the first fluidic channel, a resistivity of the second fluidic channel, a capillary pressure in the capillary pump, and a capillary pressure in the third fluidic channel is such that the coating fluid does not flow into the third fluidic channel when propagating from the first fluidic channel to the second fluidic channel, via the common junction, and
  - wherein at least part of the first fluidic channel is meander-shaped such that the resistivity of the first fluidic channel is greater than the resistivity of the second fluidic channel;
propagating the coating fluid from the first fluidic channel to the second fluidic channel, via the common junction, thereby coating the common junction and at least a portion of the second fluidic channel; and
while propagating the coating fluid, creating a fluidic flow path at the common junction such that the coating fluid does not propagate into the third fluidic channel.

11. The method according to claim 10, wherein the fluidic device further comprises a fourth fluidic channel also intersecting at the common junction,
- wherein the capillary system is further configured to provide a capillary pressure in the fourth fluidic channel such that the coating fluid does not flow into the third fluidic channel or the fourth fluidic channel when propagating from the first fluidic channel to the second fluidic channel, via the common junction, and
- wherein creating a fluidic flow path comprises creating an inward flow in the third fluidic channel and in the fourth fluidic channel, towards the common junction.

12. The method for sensing an analyte from a sample fluid, the method comprising:
providing a fluidic device having:
- a first fluidic channel, a second fluidic channel, and a third fluidic channel intersecting at a common junction, wherein the first fluidic channel is connected to a coating fluid reservoir, wherein the third fluidic channel is connected to a sample fluid reservoir, and wherein the coating fluid comprises elements that bind to a target analyte in the sample fluid;
- a fluid control means configured for creating a fluidic flow path for the coating fluid at the common junction such that, when coating, the coating fluid propagates from the first fluidic channel to the second fluidic channel via the common junction without propagating into the third fluidic channel;
  - wherein the fluid control means comprises a capillary system,
  - wherein the capillary system comprises a capillary pump coupled to the second fluidic channel, and
  - wherein a resistivity of the first fluidic channel, a resistivity of the second fluidic channel, a capillary pressure in the capillary pump, and a capillary pressure in the third fluidic channel is such that the coating fluid does not flow into the third fluidic channel when propagating from the first fluidic channel to the second fluidic channel, via the common junction, and
  - wherein at least part of the first fluidic channel is meander-shaped such that the resistivity of the first fluidic channel is greater than the resistivity of the second fluidic channel;
propagating the coating fluid from the first fluidic channel to the second fluidic channel, via the common junction, thereby coating the common junction and at least a portion of the second fluidic channel; and
while propagating the coating fluid, creating a fluidic flow path at the common junction such that the coating fluid does not propagate into the third fluidic channel, sealing the first fluidic channel and optionally sealing the second fluidic channel;
propagating the sample fluid from the third fluidic channel through the fluidic device; and
performing sensing of the target analyte at least at the coated common junction.

* * * * *